United States Patent
Bernard et al.

(10) Patent No.: US 6,813,945 B1
(45) Date of Patent: Nov. 9, 2004

(54) RESISTIVE WIRE MASS FLOW METERS

(75) Inventors: Marc Bernard, Saint-Florent-sur-Cher (FR); Eric Collet, Saint-Doulchard (FR)

(73) Assignee: Auxitrol S.A., Bourges (FR)

( * ) Notice: Subject to any disclaimer, the term of this patent is extended or adjusted under 35 U.S.C. 154(b) by 0 days.

(21) Appl. No.: 09/979,692

(22) PCT Filed: May 10, 2000

(86) PCT No.: PCT/FR00/01255

§ 371 (c)(1),
(2), (4) Date: Dec. 2, 2002

(87) PCT Pub. No.: WO00/68651

PCT Pub. Date: Nov. 16, 2000

(30) Foreign Application Priority Data

May 11, 1999 (FR) .......................................... 99 05987

(51) Int. Cl.$^7$ ................................................. G01F 1/68
(52) U.S. Cl. ................................................... 73/204.27
(58) Field of Search ......................... 73/861.95, 204.27, 73/204.21

(56) References Cited

U.S. PATENT DOCUMENTS

| 5,347,876 A | * | 9/1994 | Kang et al. .............. 73/861.95 |
| 6,023,969 A | * | 2/2000 | Feller ...................... 73/204.25 |
| 6,272,919 B1 | * | 8/2001 | Huiberts .................. 73/204.18 |

* cited by examiner

Primary Examiner—Edward Lefkowitz
Assistant Examiner—Jewel V. Thompson
(74) Attorney, Agent, or Firm—Blakely Sokoloff Taylor & Zafman

(57) ABSTRACT

A flow meter which includes a resistive wire placed in the path of a fluid whereof the flow rate is to be measured. A processing unit for applying current pulses to the wire and for determining the cooling speed of the wire between the pulses. The processing unit also determines a cooling parameter and determines from the cooling parameter data concerning a possible operational drift or anomaly.

5 Claims, 2 Drawing Sheets

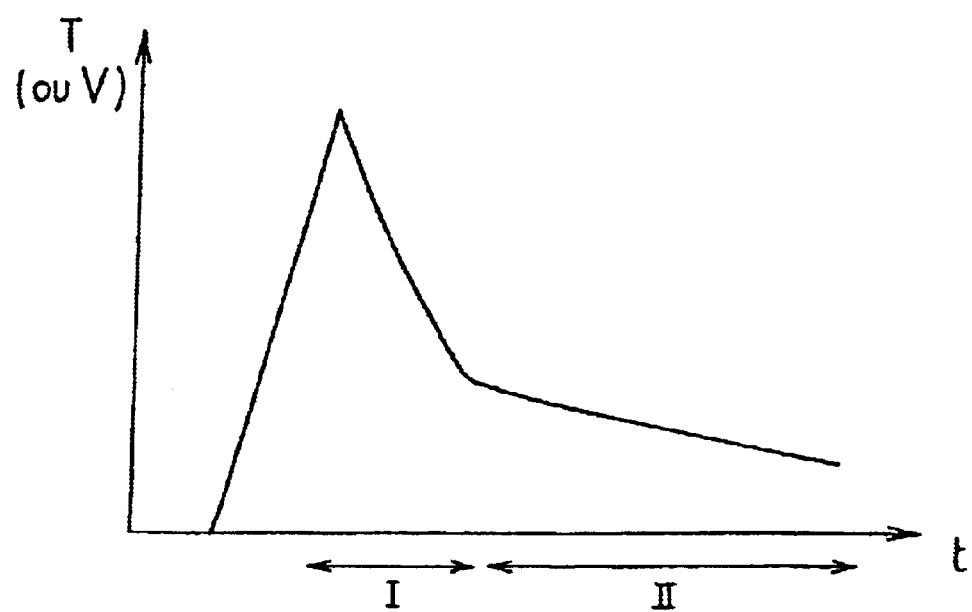
FIG_3
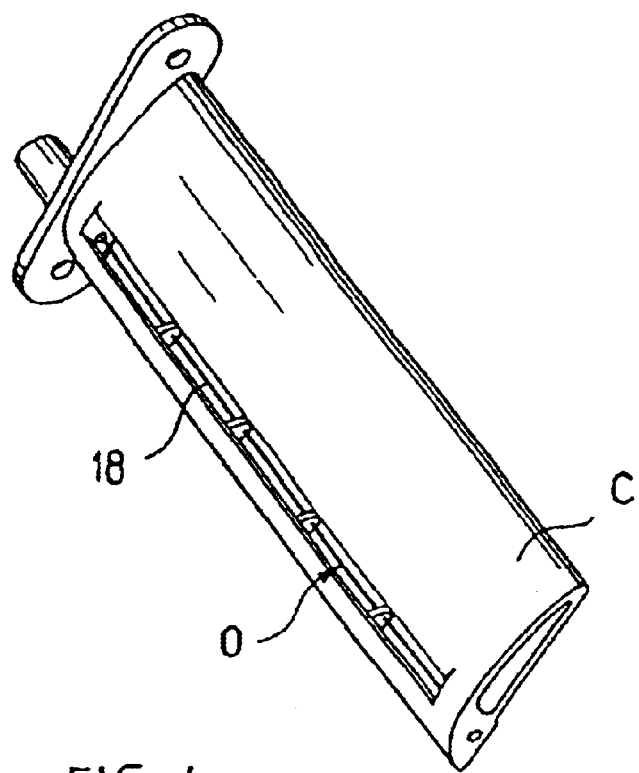
FIG_4

RESISTIVE WIRE MASS FLOW METERS

BACKGROUND FIELD

The present invention relates to resistive wire mass flow meters.

BACKGROUND INFORMATION

In his French patent application FR-2.728.071, the applicant has already proposed a hot wire flow meter for measuring a mass flow.

In it current pulses are sent through the resistive wire during given periods and the cooling speed of the wire between the pulses is measured.

It has been observed that such hot wire measuring sensors could exhibit a drift over time because, in particular, particles of grease can become deposited on the resistive wire, thus falsifying the thermal behavior of the latter.

One purpose of the invention is to propose a mass flow meter comprising means allowing this drift to be detected.

Another purpose of the invention is to propose a mass flow meter comprising means making it possible to detect operational anomalies of the electronics associated with said flow meter.

From U.S. Pat. No. 4,335,605, it is known to compare measured values with threshold values in order to detect possible operational anomalies of a flow meter.

Such processing is not very effective and does not make it possible to determine a possible drift or possible anomalies sufficiently early.

Neither does it allow a determination making it possible to correct possible drifts or anomalies.

BRIEF SUMMARY

The invention however proposes a mass flow meter of the type comprising a heating probe placed in the path of a fluid whose flow rate is to be measured, means of applying current pulses to said probe, measuring means for determining its cooling speed between said pulses, characterized in that it comprises processing means capable of determining a characteristic parameter of at least a portion of a cooling curve of the fluid and for deriving from that parameter data relating to a possible operational drift or anomaly.

Advantageously, the processing means determine the parameter after the generation of a current pulse in the absence of flow of fluid and comprise means of generating such a pulse when a start of a phase of utilizing the flow meter is detected and before the flow of the fluid is established.

According to a particularly advantageous embodiment, the processing means comprise means of determining a characteristic parameter of a first cooling phase during which the heating probe is cooled by conduction through the material which forms it and through its cover and possible oily, greasy or solid deposits, said processing means also comprising means of deriving from this parameter data relating to a possible drift due to said oily, greasy or solid deposits.

Also, the processing means can comprise means of determining a characteristic parameter of a second cooling phase during which the heating probe is cooled, also by conduction, in the fluid, but at a zero fluid flow rate and not by convection, as well as means for deriving from this parameter data relating to a possible operational anomaly of the electronics of said flow meter.

Other characteristics and advantages of the invention will furthermore emerge from the following description.

BRIEF DESCRIPTION OF THE DRAWINGS

This description is purely illustrative and is not limitative. It must be read with reference to the accompanying drawings in which:

FIG. 3 is a diagram of the temperature of the wire as a function of time,

FIG. 4 is a diagrammatic representation in perspective of a profiled body in which the wire of a flow meter according to the invention can be received.

DETAILED DESCRIPTION

Figure 2:
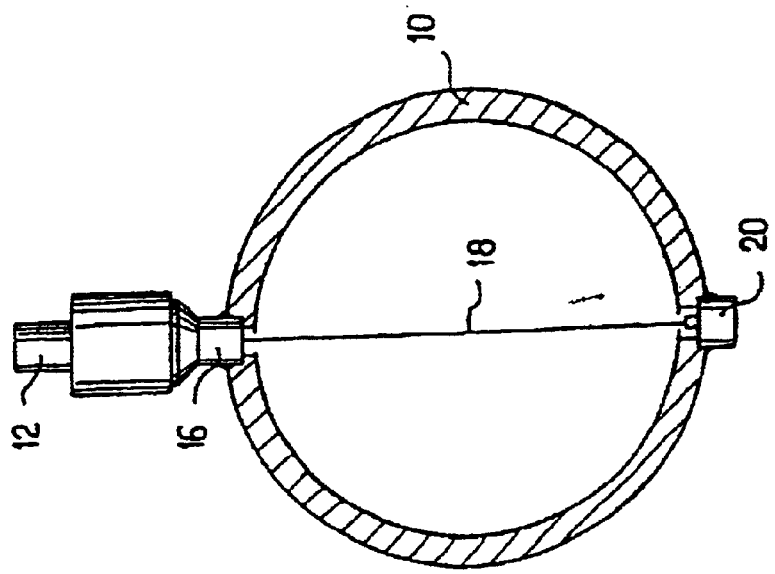
FIG. 2 is a transverse cross section of the flow meter shown in FIG. 1.
Figure 1:
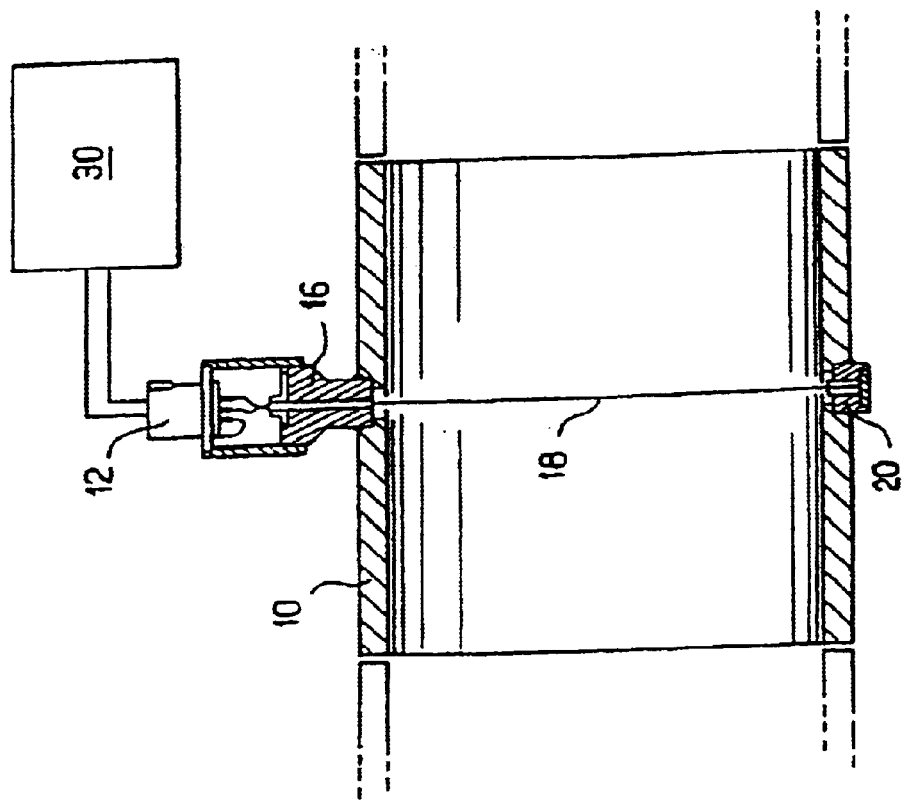
FIG. 1 is a vertical, axial cross section of a hot wire mass flow meter.

In FIGS. 1 and 2 there has been shown a hot wire mass flow meter which is for example of the type of the one described in the patent application FR-2.728.071 by the applicant which can be referred to advantageously.

This flow meter comprises a generally cylindrical hollow body 10 in which flows the fluid whose mass flow rate is to be measured. This body 10 is connected to fluid inlet and outlet pipes by appropriate fluid-tight means.

In the body 10 there extends diametrically a resistive wire 18, for example consisting of a resistive conductor bent through 180° at its bottom end and extending doubled inside a cover.

The bottom end of said wire 18 is crimped in a cylindrical ring 20 welded in a drilling in the body 10.

At its top end, the resistive wire traverses, in an electrically insulated manner, a central bore of a mount 16 fixed in another drilling in the body 10 by welding, said wire 18 being fixed to said mount 16. On said mount there is fitted a connector 12 for connecting said wire 18 to an electronic processing unit 30.

In operation, a heating of the resistive wire 18 is established by applying well-determined current pulses to it and the slope of the cooling is examined when, between the successive pulses, only a weak, insignificant current is passing through it.

Knowledge of this slope allows the processing unit 30 to calculate the mass flow of the fluid, said slope in fact being directly dependent on said mass flow.

The electronic circuit of the flow meter is designed so that the control unit 30 can know at all times on the one hand the voltage U across the terminals of the wire 18 and, on the other hand, the current I which passes through it. The instantaneous value of its resistance R=U/I is derived and therefore the instantaneous value of its temperature, the resistance varying as a function of temperature according to a monotonic law which is previously known.

Due to the fact that the measurement is made by determination of a slope (a differential measurement), the flow meter does not require any reference, unlike the majority of the previously known systems.

Thus, the flow meter is not sensitive to variations in the temperature of the fluid whose flow is to be measured.

The processing unit 30 comprises means timed to apply current pulses to the wire with the same constant value of current each time, according to a well-determined cyclic ratio. It also comprises means capable, during each period separating two successive current pulses, of acquiring the temperature of the wire by measuring its resistance. In order to be able to make this measurement, it is necessary to cause a very weak constant current to flow in the wire, the value of this current being chosen such that it does not influence the thermal behavior of the wire during its cooling. For example, the current is chosen such that a power of a few milliwatts is dissipated, in comparison with several tens of watts during the actual current pulses. Thus the temperature of the wire during its cooling is directly proportional to the voltage across its terminals.

The processing unit 30 comprises a circuit for differentiating this voltage as a function of time. The derivative thus obtained is a function of the mass flow and the processing unit 30 comprises conversion means which determine the mass flow as a function of the derivative of the voltage. For example, the unit 30 comprises storage means in which conversion tables are stored.

Furthermore, the processing unit 30 comprises means for comparing the responses obtained in voltage or in temperature with previously stored theoretical responses.

For example, before any injection of fluid (kerosene for example) into the body 10, the processing unit 30 sends a current pulse into the conductor wire 18.

The temperature response resulting from this is compared with a theoretical response, which is that of the flow meter on leaving the factory in the absence of flow.

More precisely, the processing unit 30 determines on the cooling curve two phases I and II separated by a discontinuity of cooling mode.

The inventors have in fact observed that the cooling curve comprises two distinct portions:

A first phase in which the heat generated by the current pulse is uniquely conducted by the material constituting the wire 18, by the cover of the latter and possibly by the oily, greasy or solid deposits around said cover (phase I in FIG. 3).

A second phase in which, as long as the convection around the flow meter is not yet established, the heat is conducted in the fluid (phase II in FIG. 3).

The cooling curves during the first and second of these two phases are portions of curves in exp $(-t/\tau_1)$ and exp $(-t/\tau_2)$, where $\tau_1$ and $\tau_2$ are time constants which are characteristics of the first and second of the two phases respectively.

Now, for a given heating wire, the parameter $\tau_1$ is constant as a function of the mass flow.

The time constant $\tau_2$ however is decreasing as a unction of mass flow.

The determination of the time constant $\tau_1$ by the processing unit 30 when a current pulse is sent into the conductor wire 18 in the absence of flow of fluid inside the body 10 allows the processing unit 30 to detect the present of oily, greasy or solid deposits.

If necessary, the unit 30 corrects the parameters of the processing it uses to integrate the drift due to these deposits.

The processing unit also determines the parameter $\tau_2$. It compares the value of this parameter $\tau_2$ in the absence of flow of fluid in the body 10 with a theoretical value. In the case in which the difference between this theoretical value and the value determined for the parameter $\tau_2$ is greater than a given threshold, the processing unit 30 deduces from this the existence of an anomaly in the operation of the electronics associated with the flow meter.

According to another advantageous aspect of the invention, the wire 18 of the flow meter can be received inside a profile of the type that was described in the applicant's patent application FR 91 10845 to which it will be possible to refer advantageously.

Such a profiled body has been shown in FIG. 4 in which it has been referenced by C. It has a shape like an aircraft wing which can be symmetrical or not symmetrical.

An opening O traverses said profiled body C. The wire 18 extends along the length of this opening.

The shape of said opening O and the incidence of said profiled body C in the flow of fluid being such that the boundary layer and the flow to be measured penetrate into said opening O in such a way as to avoid or reduce the impacts of particles (solid particles in the case of a liquid fluid; solid and liquid particles in the case of a gaseous fluid).

What is claimed is:

1. A mass flow meter of the type comprising a heating probe (18) placed in the path of a fluid whose flow rate is to be measured, means (30) for applying current pulses to said probe, measuring means for determining said probe's cooling speed between said pulses, characterized in that it comprises processing means (30) capable of determining a characteristic parameter of at least a portion of a cooling curve of the heating probe and for deriving from that parameter data relating to a possible operational drift or anomaly.

2. The mass flow meter as claimed in claim 1, characterized in that the processing means (30) determine the parameter after the generation of a current pulse with a zero fluid flow and comprising means of generating such a pulse when a start of a phase of utilizing the flow meter is detected and before the flow of the fluid is established.

3. The flow meter as claimed in claim 1, characterized in that the processing means (30) comprise means of determining a characteristic parameter of a first cooling phase (I) during which the heating probe is cooled by conduction through the material which forms it and through said probe's cover and possible oily, greasy or solid deposit, said processing means also comprising means of deriving from this parameter data relating to a possible drift due to said oily, greasy or solid deposits.

4. The flow meter as claimed in claim 1, characterized in that the processing means (30) comprises means for determining a characteristic parameter of a second cooling phase during which the heating probe (18) is cooled, also by conduction, in the fluid, but at a zero fluid flow rate and not by convection, as well as means for deriving from this parameter data relating to a possible operational anomaly of the electronics of said flow meter.

5. The flow meter as claimed in claims 1, 2, 3, or 4 further comprising a profiled body (C) of an aircraft wing type and in that the opening (O) traverses said profiled body (C), the heating probe extending along the length of this opening, the shape of said opening (O) the incidence of said profiled body (C) in the flow of fluid being such that a boundary layer and the flow to be measured penetrate into said opening (O) in such a way as to avoid or reduce the impacts of particles on a heating probe.

* * * * *